United States Patent [19]

Gerzanich

[11] 4,341,059
[45] Jul. 27, 1982

[54] DUAL COUPLING MECHANISM FOR PROVIDING FLOATATIONAL OPERATION OF A FRONT MOUNTED CUTTING ASSEMBLY

[75] Inventor: Michael Gerzanich, Hopelawn, N.J.

[73] Assignee: LeHara Manufacturing Co., Inc., East Brunswick, N.J.

[21] Appl. No.: 198,786

[22] Filed: Oct. 20, 1980

[51] Int. Cl.$^3$ ............................................. A01D 49/00
[52] U.S. Cl. ..................... 56/15.8; 56/15.9; 56/DIG. 22
[58] Field of Search ...................... 56/15.8, 15.9, 15.7, 56/16.2, DIG. 22, 12.7

[56] References Cited

U.S. PATENT DOCUMENTS

| | | | |
|---|---|---|---|
| 1,280,373 | 10/1918 | Beckner | 56/15.9 |
| 2,909,883 | 10/1959 | Pool | 56/15.9 |
| 2,944,377 | 7/1960 | Frieburg | 56/15.9 |
| 3,107,472 | 10/1963 | Witt et al. | 56/DIG. 22 |
| 3,884,019 | 5/1975 | Gerzanich | 56/15.8 |
| 4,203,275 | 5/1980 | Vermeer | 56/15.8 |

*Primary Examiner*—Paul J. Hirsch
*Attorney, Agent, or Firm*—Arthur L. Plevy

[57] ABSTRACT

There is provided a coupling section which comprises a main planar body having an aperture at one end. Extending from the main planar body on a first side is a rod. Secured to the end of this rod is a depending flange having an aperture coaxial with the aperture in the main body. An extending tab is secured to the vehicle body and is aligned between the flange and the main body. The tab has an aperture which, when aligned with the apertures in the flange and main body, provide a pivot point when a suitable pin or bolt is inserted through the apertures. The other side of the planar body contains a box-like housing having an extending rod to which a movable piston associated with a hydraulic cylinder is coupled. The cylinder body is rigidly secured to the vehicle chassis. The front end of the planar body has a transverse flange to which one end of a cutting head support beam is coupled. The other end of the beam is coupled to one side of a cutting head assembly. The above described coupling apparatus is employed at both ends of a cutting head and hence, identical coupling sections are employed to provide support for two beams between which a cutting assembly is positioned.

10 Claims, 2 Drawing Figures

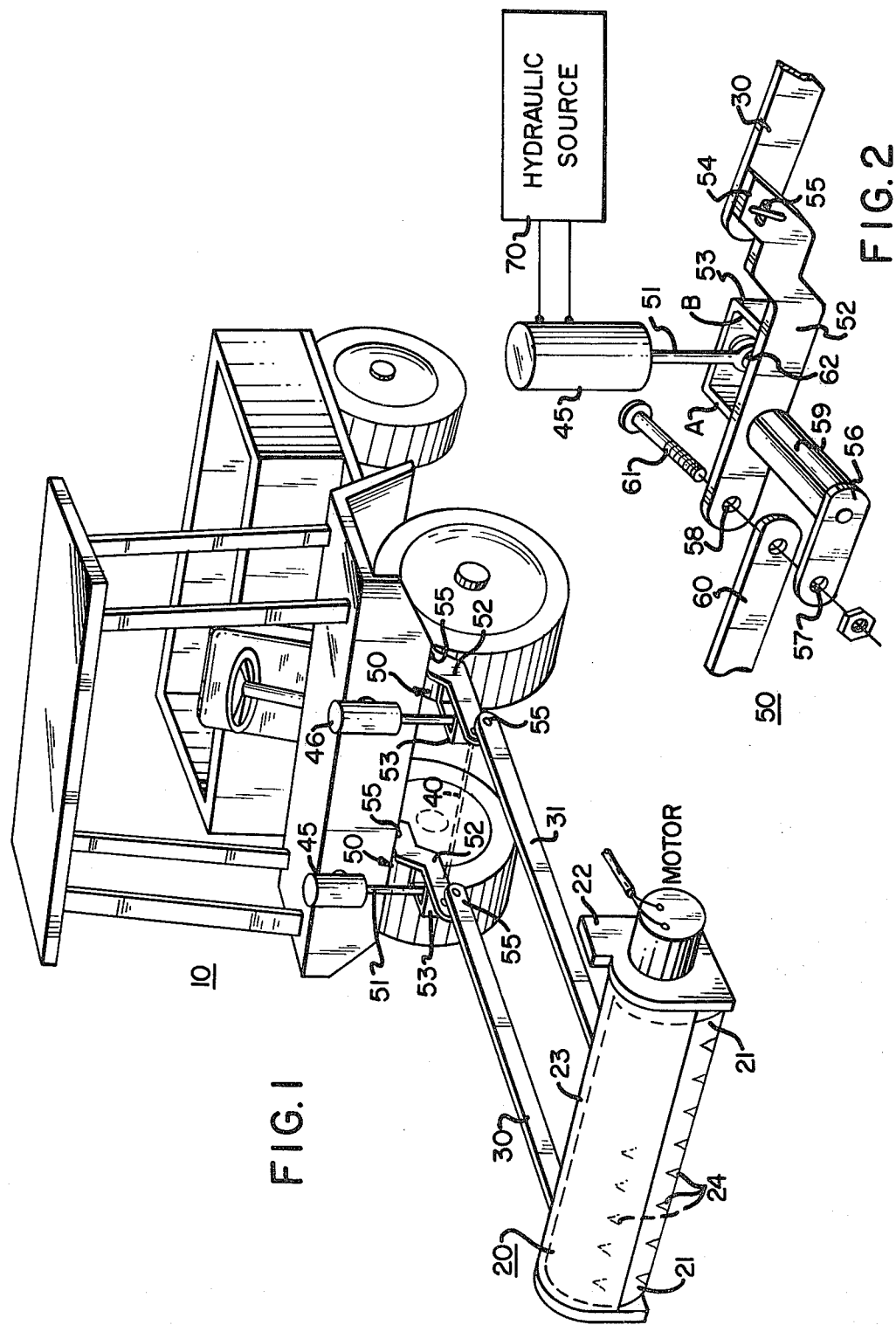

4,341,059

DUAL COUPLING MECHANISM FOR PROVIDING FLOATATIONAL OPERATION OF A FRONT MOUNTED CUTTING ASSEMBLY

BACKGROUND OF THE INVENTION

This invention relates to mowers of the type which precede the vehicle upon which the mower is mounted and more particularly to a floatational mowing assembly adapted to be mounted on relatively small vehicles.

The prior art is replete with a number of patents which depict various apparatus for cutting grass and are designated as mower assemblies. Essentially, there is a need for a small mower vehicle in combination with an efficient cutting head to enable an operator to gain access to grass covered areas.

A front driven mower assembly offers many advantages in that the operator or driver of the vehicle can see the terrain he is negotiating and therefore cut vegetation according to his discretion. The prior art, as indicated, shows a number of patents including various mower arrangements adapted to mow according to the contours of the terrain and to enable one to provide an accurate cut, even though the surface may undulate. If reference is made to U.S. Pat. No. 3,884,019 issued on May 20, 1975 to Michael Gerzanich, this patent describes a number of prior art configurations as well as a mower system employing a tracked vehicle.

Essentially, as can be ascertained from the above noted patent as well as many references, the mower assembly has to be mounted on the tractor or vehicle in such a manner as to allow the cutting head to tilt according to the contour of the ground and hence, to provide a uniform cut. One also has to consider the differences in weight of the cutting head in order to assure that the operation of the head assembly is relatively uniform and hence, the vehicle as well as the mower assembly operates to provide uniform operation.

BRIEF DESCRIPTION OF THE PREFERRED EMBODIMENT

Apparatus for mowing vegetation on undulating terrains, including a vehicle of the type including a frame assembly having a front end with first and second extending tabs on said front end, each having an aperture, and a back end, the improvement therewith of apparatus for providing a front, floatational mower suspension assembly comprising a first and second coupling section, each comprising a main planar body having an aperture at a first end, an extending rod coupled to said body on a first side and having a depending flange with an aperture on said flange coaxial with said aperture on said first end to provide a space therebetween for accommodating one of said extending tabs, with pins inserted through said apertures to provide a pivot point for said planar body, said planar body having a box-like housing positioned on the side opposite that containing said rod, first and second cylinder assemblies, each having a movable piston, said cylinder assemblies coupled to said vehicle frame, with each piston coupled to an associated one of said planar members within said box-like housing, said planar members having a front end remote from said first end, a first and a second extending beam coupled to said front end of an associated planar member, and a cylindrical cutting head rotatably mounted between said beams.

BRIEF DESCRIPTION OF THE FIGURES

FIG. 1 is a perspective plan view of a front mounted cutting assembly employing coupling sections according to this invention; and FIG. 2 is a plan view of a coupling section which is used to couple a flail cutting assembly to a vehicle.

DETAILED DESCRIPTION OF THE INVENTION

Referring to FIG. 1, there is shown a particularly useful type of tractor 10 which constitutes a rear wheel drive vehicle. Such a vehicle 10 is manufactured by various companies. A particular useful type of vehicle is manufactured by Reform Werk of Austria and is known as the Reform Metrac 3000. This particular vehicle contains hydraulic drive systems with a central driver's cab and may include a three point power lifting hoist which can raise or lower a typical mower assembly. The vehicle 10 employs a diesel engine to provide the necessary traction force to be transmitted to the back wheels and a separate hydraulic system for operating the hoist.

As shown in FIG. 1, the vehicle 10 has coupled to the front end thereof a flail cutting assembly 20. The flail cutting assembly 20 is well known and basically constitutes a longitudinal cylinder 21 which rotates through a drive system 22. The cylinder is contained in a protective housing 23 and has a series of cutting knives 24 arranged on the outer periphery of the cylinder. Hence, as the cylinder 21 is rotated, the cutting knives flail and operate to cut heavy vegetation such as grass, shrubs and so on.

Normally, a cylinder such as 21 would have at least five sets of cutting blades aligned in rows about the surface with each set containing eight or more cutting blades across the length of the cylinder. A description of such a cutting assembly is also had in referring to U.S. Pat. No. 3,884,019.

The vehicle 10, as shown in FIG. 1, is extremely versatile and can negotiate extremely rough terrains, as the wheels and configuration result in a very low center of gravity which therefore provides good traction when the vehicle is negotiating undulating terrains or surfaces.

As shown in FIG. 1, the cutting head assembly 20 is coupled to the front of the vehicle 10 by means of beams 30 and 31. The beams 30 and 31 are coupled to the hydraulic hoist of the tractor 10 (not shown) and hence, the entire assembly can be raised or lowered as desired. The hydraulic hoist in such a vehicle is a centrally operated hoist which has two depending arms which are coupled to the beams 30 and 31 and hence, operate to lift or lower the beams and therefore, the cutting head 20. The manufacturers of such vehicles employ an additional bar or steel beam 40 (shown in dashed line) to further strengthen the assembly and to provide additional support between the arms 30 and 31.

In the configuration shown, the arms 30 and 31 are coupled to hydraulic cylinders 45 and 46, which cylinders also serve to lower or raise the cutting mechanisms 20. As indicated, if a bar 40 is positioned as shown, the fail mowing assembly 20 cannot follow the contours or undulations of a typical area to be cut. Accordingly, the bar restrains tilting motion of the cutting head 20, which head will assume the same plane as the vehicle 10. In this manner, if the vehicle 10 were tilted to the left or right, the cutting head will also tilt to the left or right.

This is extremely undesirable as, for example, the tilting of the vehicle is a function of the level of the ground that it is traversing, while the cutting head 20 may be on ground which is at a different angle or level than the vehicle.

In the prior art mechanisms, due to the restraining rod as 40, the cutter assembly is forced to assume the same angle as the vehicle and hence, it may be at an improper angle to provide optimum cutting. In order to compensate for this, the operator may have to recut the same spot by approaching the area from a different direction. This involves a great deal of expense and time.

According to this invention, the bar 40 or similar structures between the two beams 30 and 31 are eliminated and each hydraulic cylinder as 45 and 46 is attached to a separate identical coupling section 50, as will be described in FIG. 2. The coupling section 50 permits the arms 30 and 31 to be coupled to the front of the vehicle by means of heavy metal tabs 60 which are positioned on the chassis of the vehicle at the front end.

Each hydraulic cylinder as 45 and 46 is coupled to the body of the tractor with its movable pistons coupled within a box housing to the respective coupling section 50. The coupling section is pivotally mounted on the vehicle chassis, as will be explained in referring to FIG. 2.

In FIG. 2, there is shown the hydraulic cylinder 45. The main body of the cylinder is rigidly secured to the chassis of the vehicle. The extending piston arm 51 is coupled to a rod 62 contained within a box-like housing 53. The term "box-like" housing is employed as a generic term. Actually, the housing 53 is a U-shaped member having an open top and open bottom. The adjacent sides as A and B are welded to the side of the planar member 52 with the rod 62 extending from the surface of the planar member to the wall of the housing 53 located between sides A and B. It is, of course, understood that the housing 53 may be a box-like member having an open bottom and an open top with a main sidewall welded to the sidewall of the planar member.

The housing 53 is rigidly secured to the side of the coupling section 50. The main body of the coupling section 52 has a front end 54 which is relatively transverse to the body 52 and has an aperture 55. The beam as 30 or 31 is coupled to the section 50 by means of aperture 55 by the insertion of a suitable bolt therethrough. The bolt may be locked by means of a nut or a pin as shown.

Located on the opposite side of the main body 52 is a transverse extending bar 59. The bar 59 is terminated in a first flange section 56 having an aperture 57 located thereon. The bar 59 is fabricated from a heavy steel stock and is welded or otherwise secured to the body 52. The body 52, at its other end, contains an aperture 58. As can be seen from FIG. 2, the extending projection 60 which is coupled to the vehicle chassis is positioned between flange 56 and the end of the body 52.

A bolt 61 is inserted through aperture 58, the slot in member 60 and aperture 57 and operates as a pin to allow the coupling section 50 to pivot with respect to the vehicle chassis. Hence, each cylinder 45 and 46 is associated with an identical coupling mechanism. The respective coupling mechanisms 50 are rigidly attached to the beams 30 and 31 via the front transverse sections 54. Each cylinder, when operated, will cause the piston 50 to retract, thus aiding in raising the assembly or to extend, thus aiding in lowering the assembly.

The cylinders are hydraulic cylinders and receive hydraulic fluid from the hydraulic source 70 associated with the tractor. In this manner, the cylinders 45 and 46 are now coupled to arms 30 and 31 via a right and left coupling section as shown in FIG. 2. Each cylinder operates as an individual spring to therefore allow the entire cutting mechanism to pivot or move in the vertical plane and hence, follow the contour of the ground independent of the position of the tractor.

It is further noted that the cutting mechanism 20 is heavier on the right side due to the fact that the driving mechanism 22 is positioned on this side. Therefore, in order to provide optimum operation, the fluid pressure directed to cylinder 46 is increased and hence, cylinder 45 operates under less pressure than cylinder 46. In this manner, one can compensate directly for the increased weight due to the mower driving mechanism.

Thus, as one can ascertain, each beam as 30 and 31 is coupled to a separate coupling section 50, which section is associated with a separate cylinder and piston assembly as 45 and 46. The box housing 53 serves to restrain lateral movement of the piston arm, but allows the arm to move along the length of the bar 52, thus tending to absorb impulse type of forces. The coupling section 50 provides a pivot joint with the extending tab 60 as secured to the vehicle chassis.

Hence, it is ascertained that the removal of all reinforcing bars between the beams 30 and 31 and the utilization of the coupling sections 50 enable the cutting head or mechanism 20 to exactly follow the contours of typical irregular surfaces and thus greatly reduce the amount of time required to cut large areas by allowing the cutting head 20 to follow the contour of the ground based on the unique coupling sections as shown in FIG. 2.

It is further noted that the subject matter of this invention has been disclosed in Disclosure Document No. 91,728 filed in the United States Patent and Trademark Office on June 17, 1980 by Michael Gerzanich, the inventor herein.

I claim:

1. Apparatus for mowing vegetation on undulating terrains, including a vehicle of the type including a frame assembly having a front end with first and second extending tabs on said front end, each having an aperture and a back end, the improvement therewith of apparatus for providing a front, floatational mower suspension assembly, comprising:

a first and a second coupling section each comprising a main planar body having an aperture at a first end, an extending rod coupled to said body on a first side and having a depending flange with an aperture on said flange coaxial with said aperture on said first end, to provide a space therebetween for accommodating said extending tabs, with means inserted through said apertures to provide a pivot point for said planar body, said planar body having a box-like housing positioned on the side opposite that containing said rod, first and second cylinder assemblies each having a movable piston, said cylinder assemblies coupled to said vehicle frame, with each piston coupled to an associated one of said planar bodies within said box-like housing, said planar members having a front end remote from said first end, a first and a second extending beam coupled to said front end of an associated planar body, and a cylindrical cutting head rotatably mounted between said beams.

2. The apparatus according to claim 1 wherein said means inserted through said apertures is a pin to provide a pivot.

3. The apparatus according to claim 1 wherein said front end of said planar body comprises an extending transverse section having a beam coupling aperture located therein.

4. The apparatus according to claim 1 wherein said box-like housing includes a piston coupling rod extending from said surface of said planar body to a remote surface of said box-like member, and means for coupling said piston to said coupling rod.

5. The apparatus according to claim 1 wherein said box-like housing has an opened bottom and opened top.

6. The apparatus according to claim 1 wherein said cylindrical cutting head is a flail cutting head having a plurality of cutting blades on a surface thereof.

7. The apparatus according to claim 1 further including hydraulic source means coupled to said cylinders.

8. The apparatus according to claim 7 wherein one of said cylinders is operated at a lower hydraulic pressure than the other.

9. The apparatus according to claim 1 wherein said vehicle is a rear wheel drive vehicle.

10. The apparatus according to claim 1 wherein said box-like member is a "U" shaped member having first and second sidewalls coupled to said planar member with a backwall, a piston support rod coupled between said backwall and said surface of said planar member.

* * * * *